AUTOMATIC SPRAY PAINTING APPARATUS

Filed Nov. 14, 1958 2 Sheets-Sheet 1

Inventor:
Robert W. Wullenwaber
By Spensley and Horn
Att'ys.

AUTOMATIC SPRAY PAINTING APPARATUS

Filed Nov. 14, 1958 2 Sheets-Sheet 2

Inventor:
Robert W. Wullenwaber
By Spensley and Horn
Att'ys.

United States Patent Office 3,006,316
Patented Oct. 31, 1961

3,006,316

AUTOMATIC SPRAY PAINTING APPARATUS

Robert W. Wullenwaber, Rolling Hills Estates, Calif., assignor to Pacific Semiconductors, Inc., Culver City, Calif., a corporation of Delaware Filed Nov. 14, 1958, Ser. No. 774,061
5 Claims. (Cl. 118—11)

The present invention relates to an automatic spray painting apparatus and more particularly to an apparatus for painting a predetermined part of a small component such as the central section of a coaxial semiconductor crystal diode package.

Paint coatings or decorations, either single, or multicolor may be accurately deposited upon small components by the use of a spray gun, or by a hand paint brush.

The economical painting of the surfaces of a sequence of identical glass cylinders, such as the cylinder forming the body of a semiconductor package of the type described in United States Patent No. 2,815,474 entitled "Glass Sealed Semiconductor Rectifier" by W. M. Lewis, et al., issued December 3, 1957, for example, requires an automatic apparatus. Such an automatic apparatus should preferably not require the presence of a skilled operator and yet be economical and rapid in operation.

It is therefore an object of the present invention to provide an improved apparatus for automatically painting the surface of a plurality of small components.

Another object of the present invention is to provide an appaartus for automatically painting a predetermined portion of the surface of a package housing a small component.

Yet another object of the present invention is to provide an apparatus for automatically painting the outer surface of the central glass envelope forming part of a package for hermetically sealing a semiconductor electrical translating device.

A further object of the present invention is to provide an automatic paint spraying machine for painting a predetermined portion of the central glass envelope forming part of a glass-metal package housing a semiconductor electrical translating device without permitting any paint to be applied to the metal parts of the package.

In accordance with the presently preferred embodiment of the invention there is provided a motor driven conveyor which carries a plurality of small electric motors. The small motors each include a projecting shaft. The motors are so oriented as to have their shafts disposed perpendicular with respect to the conveyor chain and parallel to each other. A generally tubular hollow lower mask fits over each of the projecting shafts. The lower mask is adapted to receive one end of the component being painted such as, for example, a semiconductor diode package as has heretofore been mentioned. A second or upper mask is then placed upon the opposite end of the diode package, thus leaving exposed only the central section. The small motors carrying the masks and the diodes are transported before a fixed paint station which includes a spray gun which is automatically triggered. The diodes next pass under infra-red lamps for drying and then to a mask removing station and a diode removing station where the upper masks and the diodes are removed.

The novel features which are believed to be characteristic of the invention both as to its organization and method of operation, together with further objects and advantages thereof, will be better understood from the following description considered in connection with the accompanying drawings in which a presently preferred embodiment of the apparatus of the present invention is illustrated by way of example. It is to be expressly understood, however, that the drawings are for the purpose of illustration and example only, and are not intended as a definition of the limits of the invention.

Figures 1, 2:
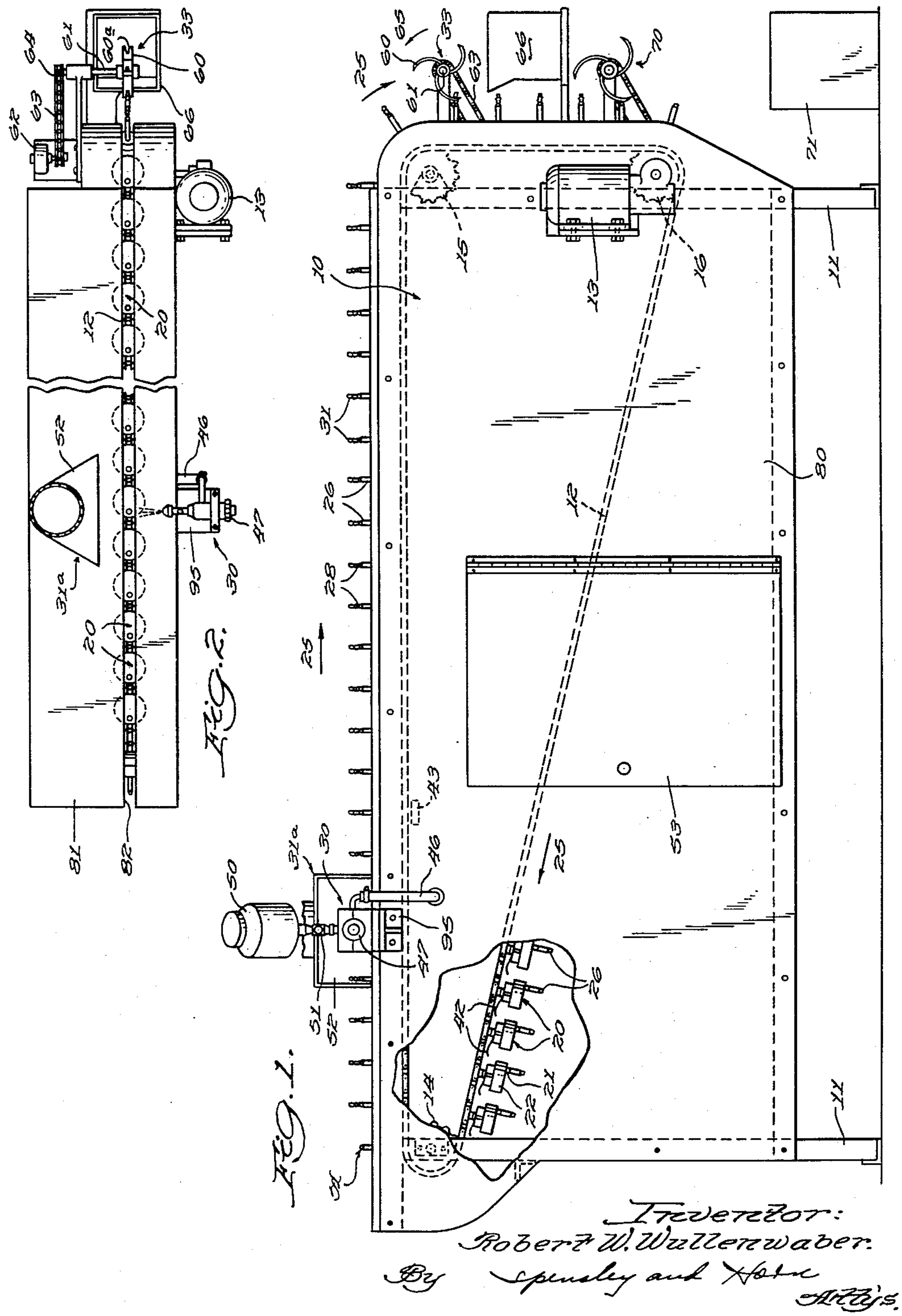
FIGURE 1 is a front elevation of an automatic paint spraying apparatus constructed in accordance with the presently preferred embodiment of the invention.
FIGURE 2 is a plan view, reduced in size, of the apparatus shown in FIGURE 1.

Referring now to the drawings and more particularly to FIGURE 1 there is shown a paint spraying apparatus constructed in accordance with the presently preferred embodiment of this invention. As has been previously indicated, for purposes of simplicity of clarity and explanation, it is assumed that a conventional semiconductor diode housing or package which includes a central ceramic or glass cylinder 28 and two extending metal pins 29 is the article to be painted. It will further be assumed that only the central glass cylinder 28 is to be painted while the metal pins extending from either end thereof are to be masked.

The apparatus includes, in general, a main supporting structure 10 supported by legs 11, and a stationary spray station 30 through which the articles are rotated to receive a complete application of paint while within the paint spraying area. In the presently preferred embodiment, the conveying means comprises a continuous conveyor belt or chain 12 driven by means of a motor 13 through a continuous circuit which includes a horizontal support track disposed parallel with and just below the top of the housing structure 10. Two idler sprocket wheels 14 and 15 are rotatably mounted within the support housing 10 on substantially horizontal shafts with the radius of the idler sprocket wheel being tangential to a line parallel to and spaced slightly below the upper surface of the support housing. The conveyor drive motor 13 is mounted partially within the support housing 10 through an opening in the side wall 80 thereof in such a manner as to drive the drive wheel 16 through suitable gear mechanisms well known to the art. The chain 12 in the presently preferred embodiment is a link chain of the type well known to the art which is engaged by both idler sprockets and the drive wheel for driving in a closed circuit in the direction as shown by the arrow 25.

Figures 3, 4, 5, 6, 7, 8:
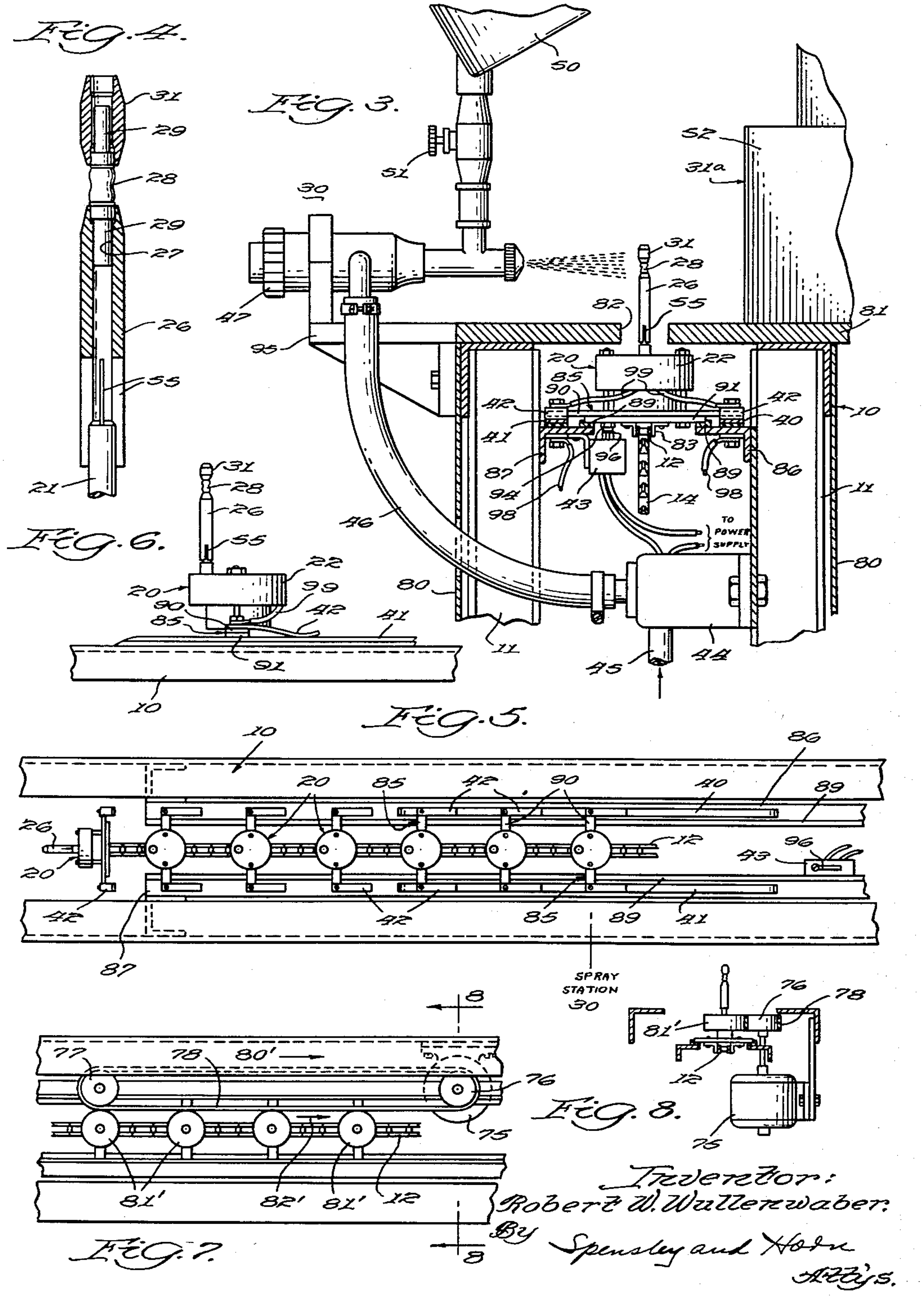
FIGURE 3 is a side elevation, partly in section, enlarged in size, showing the spraying station of the apparatus of FIGURE 1.
FIGURE 4 is an enlarged cross-section showing a diode to be painted which is mounted, together with appropriate masks, upon the extending shaft as shown in FIGURE 1.
FIGURE 5 is an enlarged partial plan view of the apparatus of FIGURE 1 showing the drive energization means for the motors carrying the masks and diodes.
FIGURE 6 is a front elevation showing one of the motors of FIGURE 5 as it rides over the bus bars.
FIGURE 7 is an enlarged partial plan view of an alternative embodiment of the drive energization means of FIGURE 5.
FIGURE 8 is a view taken along line 8—8 of FIGURE 7.

As best seen in FIGURES 3 and 5, the support housing 10 includes vertical side walls 80 which are spaced apart by a predetermined distance with the conveyor chain 12 being spaced substantially midway therebetween. The spacing between the side walls 80 is sufficient to accommodate the motors 20 and the electrical contacts therefor, as described hereinafter. A top plate 81 is preferably provided over the upper portion of the support housing 10 and defines a slot 82 extending longitudinally above the conveyor chain 12. As described hereinbefore, the conveyor chain 12 is spaced below the top plate 81 by a predetermined distance as discussed hereinafter.

A plurality of motors 20 are affixed to the conveyor belt 12 at spaced intervals therealong. The motors 20 support a reducing gear drive mechanism 22 as an integral part thereof through which a shaft 21 is driven. The motors 20 are affixed to the conveyor belt by means of brackets 83 which are fastened through the appropriate link of the chain-type conveyor. The brackets are in turn affixed to a supporting member which extends transverse to the conveyor belt and the motor is in turn bolted or otherwise affixed to the supporting members 85. The supporting members 85 extend substantially equidistant to each side of the conveyor belt 12 beyond the diameter of the motor. First and second longitudinal support members are affixed to the legs 11 of the support member at a position to form longitudinal support for the motor support members 85. Thus, in this embodiment, angle irons or support members 86 and 87 are spaced longitudinally along the side walls 80 such that the upper surface of the angle irons is slightly below the lower surface of the motor support member 85 (see FIGURES 3 and 5). The angle irons 86 and 87 extend inwardly from the side walls 80 a sufficient distance to place them beneath an end portion of the motor support members 85. Suitable guide members 89 are affixed to the support members 86 and 87 to guide the members 85 in sliding contact therewith. Support members 86 and 87 are provided to furnish support for the motors and the chain drive between the idler sprockets 14 and 15 to insure a horizontal path of travel for the motors. A portion of the motor support 85 extends outwardly beyond the guides 89 above the upper surface of the longitudinal supports 86 and 87. In the present embodiment, the motor support 85 is thus formed of two support bars of unequal length with the upper support bar 90 having a greater length than the lower support bar 91 (see FIGURE 3). Thus, the upper support bar 90 extends outwardly beyond the lower support bar and is spaced a substantial distance above the upper surface of the longitudinal support members 86 and 87. The upper support bar 90 has affixed at each end thereof an electrical contact member 42 which is in sliding electrical contact with bus bars 40 and 41 affixed to each of the longitudinal support members 86 and 87 at the upper surface thereof as described in detail hereinafter.

The electric motors 20 are affixed to the conveyor chain in such orientation that the shaft 21 extending from each motor is positioned vertically and substantially midway between the edges of the slot 82 and the upper plate 81 of the support member, as may best be seen in FIGURE 5. Thus, the distance at which the conveyor chain 12 is spaced below the upper plate 81 of the support housing 10 is such that the motor 20 including the gear mechanism 22 is just below the upper plate 81 while the shaft extends at least partially through the longitudinal slot 82. Thus, as the chain is moved by the drive motor 13, the motors 20 are carried longitudinally beneath the slot 82 of the support housing 10 with shafts extending upward from the motors.

Means are provided for couplling the diode to be painted to a respective shaft 21 of a motor 20 and such coupling preferably also furnishes a means for masking the lower portion of the diode which is to be left unpainted. Thus, in this embodiment a lower mask 26 which may best be seen in FIGURE 4 is fitted over a shaft 21. The lower mask 26 is generally cylindrically shaped and includes a central opening 27 to receive one end of the device to be painted. The lower end of the mask 26 includes a friction fit means such as a plurality of vertically disposed slots 55 extending upward from the bottom of the mask to form a spring-like friction fit with the shaft 21. This insures a secure gripping between mask 26 of the shaft 21 such that when the motors are upside down when the chain revolves the masks will remain upon the shaft. In this embodiment, in order to mask the upper portion of the diode, an upper mask is also utilized. The other mask is simply a cylinder which is mateable with the upper portion of the diode which is to be left unpainted.

A paint spray station 30 is positioned to spray paint at a spraying area positioned above the upper surface of the support housing at a height corresponding to the height of the diode. This is clearly shown in FIGURE 1. Means are then provided for causing the paint to be sprayed as a diode moves through the painting area. In this embodiment, therefore, a spray gun 47 is affixed by means of a support bracket 95 to the support housing at one side thereof. The paint spray gun is spaced from the centerline of the longitudinal slot 82 at the proper distance to furnish a suitable painting area through which the diode must pass. Fixedly secured atop the spray gun 47 is a paint container 50. A paint metering valve 51 is provided between the container 50 and the gun 47 to control the flow of paint to the gun. Opposite the spray gun 47 and in the line of spray therefrom is located an exhaust 52 to receive the paint fumes. In order to actuate the spray gun only at the times to which a diode is passing through the painting area, a solenoid valve 44, is utilized in this embodiment as shown in FIGURE 3. Compressed air is supplied from a source not shown through the compressed air line 45 to the solenoid valve 44 which is affixed within the support housing 10. When the solenoid valve is open, compressed air passes through air line 46 to the paint spray gun 47 to actuate the paint spray gun. Actuation of the solenoid valve 44 at the proper time sequence is obtained in this embodiment by means of a micro-switch 43. The micro-switch 43 (see FIGURES 1 and 5), is affixed proximate the conveyor belt 12 and beneath the path of travel of the motor support members 85. To one side of the motor mounting brackets 83 between the bracket and the guide member 89 there is positioned contacter 94. The micro-switch 43 is then positioned such that the switch actuater 96 is depressed by the contact 94 as the motor passes the switch 43. The switch 43 is spaced longitudinally with respect to the spray station 30 in such a manner that the micro-switch 43 and the spray gun 47 are actuated by a motor 20 which is forward of the motor carrying the diode to be painted. That is, determined by the spacing of the motors 20, each from the other, the micro-switch 43 is placed forward of the paint station by a distance which, if two times the length of the spacing between motors, for example, will actuate the spray gun to spray the diode which is two positions behind the diode and the motor then passing over the micro-switch. The spacing between the spray station 30 and the micro-switch 43 is thus arranged such that the spraying will occur only when a motor is in alignment beneath the spray gun. In the presently preferred embodiment, the distance between the spray gun nozzle and the micro-switch 43 is three inches.

As discussed hereinbefore, the diode is made to rotate when it is within the spraying area by means of sliding contacts 42 affixed to each of the motors, which contacts energize the motor when the contacts slide over the bus bars 40 and 41. Electric power is supplied to the bus bars through electrical connecters 98 leading from a power supply which is not shown. Thus, when the sliding contacts 42 are in contact with the bus bars 40 and 41, the motors 20 are energized through the bus bars, the sliding contacts, the connecters, and the leads 99. The longitudinal position of the bus bars is such that the spring contacts 42 will pass over the bus bars and energize the motors. A sufficient length of the bus bars is provided before the spray station 30 to allow the motor 20 and the diode carried thereby to come to rotating speed prior to entering the spray station. Further, the opposite end of the bus bars is spaced forward of the spray station at a position to which rotation of the diodes is no longer desired or necessary. A plurality of infra-red lamps or other means for drying the paint may be disposed along the top of the structure 10 as desired, subsequent to the position at which the diode being painted leaves the painting area.

At the position as shown in FIGURE 1, after the motor 20 has completed the horizontal passage and started the downward descent after passing the idler sprocket 15, a means for stripping the upper mask from each of the diodes is provided. The stripping mechanism 33 is affixed to the support housing as shown in FIGURE 1 and will automatically remove the upper mask 31 from each of the diodes as they pass thereby. The stripping mechanism 33 consists of one or more arms 60 which are rotated about a central shaft 61 by means of a motor 62 and drive belt 63 and pulley 64 as may best be seen in FIGURE 2. The arms 60 include a V-shaped notch **60*a* to insure the gripping of the bottom of the mask 31. As the arms 60 rotate in the direction as indicated by arrow 65 and as the diode passes downward in the direction of arrow 25 it is clear that the mask will be stripped from the top of the diodes. These masks will then fall into a receptacle 66 to be collected therein for subsequent reuse by the operator. A similar stripping mechanism 70 is provided below mechanism 30 to strip the diodes from the lower masks 26 causing them to fall and be collected by container 71**.

Referring now to FIGURES 7 and 8 therein is shown an alternative embodiment of a diode rotating mechanism to be used in connection with conveyor 12 which can be used in accordance with the present invention. Instead of employing motors such as 20 to rotate the articles being painted, a friction drive can be employed consisting of a motor 75 and a wheel 76 together with a pulley 77 and a belt 78. The motor 75 will drive the belt continuously in the direction as indicated by arrow 80¹. The belt will come into contact with the edge of the rotors 81¹ causing them to be driven in the direction of arrow 82¹ thus effectively turning the diode in front of the spray guns without the use of individual motors such as 20.

Accordingly, in the operation of the presently preferred apparatus, an operator places a diode to be painted in the lower mask which is affixed to a motor shaft at the position generally designated as A in FIGURE 1. After the diode has been positioned in the lower mask 26 an upper mask 31 is positioned on the diode again generally at the position shown as A with the motor 13 energized. The drive wheel 16 drives the chain conveyor 12 continuously, thus moving the recently loaded diodes to the right in FIGURE 1 and from the position A toward the paint station 30. As the motor 20 passes toward the paint station 30 the sliding contacts move into electrical contact with the bus bars and commence the rotation of the shafts 21 and the diode associated therewith prior to entering the painting area 30. At this position, the diode is rotated with the opposite ends thereof masked to leave exposed for painting only the central glass cylinder 28. The spray gun is actuated by a motor two positions ahead of the motor entering the painting area to trip the spray gun at the time the diode to be painted enters the painting area as described hereinbefore. After passing through the area, the shaft and diode continue to rotate until the sliding contact 42 moves off the bus bars 40 and 41. The diodes then continue the horizontal path of travel and are preferably dried during this period of the cycle by means such as infra-red lamps. After passing the idler sprocket 15, the upper mask is stripped from the diode by the stripping mechanism 61 and the upper mask is dropped into the receptacle 66. As the diode continues its downward path, it is stripped from the lower mask by the stripping mechanism 70 and dropped into the receptacle 71. The unloaded motor carrying the lower mask then continues through the apparatus until it is again loaded at the position A.

There has thus been described a new and improved automatic spray paintaing apparatus. Various improvements and modifications may be made without departing from the spirit of the invention. For example, a plurality of spray stations may be employed to impart more than one coat of paint to the components to be painted. Further, by indexing one or more fixed masks in front of the spray gun or guns, with several small vertically aligned holes one or more lines of paint may be sprayed onto the components.

What is claimed as new is:

1. Apparatus for use in spray painting a predetermined portion of the central region of each of a sequence of two ended articles, comprising: a conveyor adapted to be driven past a spray station; a paint spray gun located at said spray station; a plurality of spaced article holders mounted upon said conveyor, said article holders being adapted for supporting the articles to be painted, said article holders being adapted to mask one end of each of said articles from the paint to be sprayed; a plurality of masks, each of said masks being adapted to fit over and mask the other end of each of said articles from the paint to be sprayed thereby leaving said central region of each of said articles exposed to the paint spray; individual drive means associated with each of said article holders for rotating said article holders when said holders are conveyed past said spray station; means for intermittently selectively actuating said spray gun as each of said article holders passes before said spray station to thereby spray the unmasked central region of an article held by said holder; and means for automatically removing said masks from said other ends of said articles after said central regions of said articles have been painted.

2. Apparatus for use in spray painting a predetermined portion of the central region of each of a sequence of two ended articles, comprising: a conveyor adapted to be driven past a spray station, said conveyor being adapted for movement from a predetermined point horizontally past said spray station and then in a generally vertically downward direction and thence generally upwardly back to said predetermined point; a paint spray gun located at said spray station; a plurality of spaced article holders mounted upon said conveyor, said article holders being adapted for supporting the articles to be painted in substantially parallel relationship, said article holders being adapted to mask one end of each of said articles from the paint to be sprayed; a plurality of masks, each of said masks being adapted to fit over and mask the other end of each of said articles from the paint to be sprayed thereby leaving said central region of each of said articles exposed to the paint spray; individual drive means associated with each of said article holders for rotating said article holders when said holders are conveyed past said spray station; means for intermittently selectively actuating said spray gun as each of said article holders passes before said spray station to thereby spray the unmasked central region of an article held by said holder; and means for automatically removing said masks from said other ends of said articles after said central regions of said articles have been painted, said means including a rotatably driven arm located adjacent said conveyor where said conveyor travels in said generally vertically downward direction, said driven arm defining a notch therein adapted to engage said masks and remove them from the articles as they pass by said last named means.

3. Apparatus for use in spray painting articles comprising: a feed conveyor adapted to be driven past a spray station; a spray gun located at said spray station; a plurality of spaced article holders mounted upon said conveyor, said article holders being adapted to support the articles to be sprayed in substantially parallel relationship; a plurality of synchronous electric motors, one of each of said motors being coupled to each of said article holders, said motors including a sliding contact adapted to make electrical contact with a bus bar; a bus bar disposed along the path of said conveyor, said bus bar being connected to a source of electric power, said bus bar further being located at the vicinity of said spray station and extending on both sides thereof; means for selectively actuating said spray gun as each of said article holders passes before said spray station, said means including a switch located down stream of said spray station, said switch being adapted to be actuated by said motors as they pass thereby.

4. Apparatus for use in spray painting a predetermined portion of the central region of each of a sequence of two ended articles, comprising: a conveyor adapted to be driven past a spray station; a paint spray gun located at said spray station; a plurality of spaced article holders mounted upon said conveyor, said article holders being adapted for supporting the articles to be painted in substantially parallel relationship, said article holders being adapted to mask one end of each of said articles from the paint to be sprayed; a plurality of masks, each of said masks being adapted to fit over and mask the other end of each of said articles from the paint to be sprayed thereby leaving said central region of each of said articles exposed to the paint spray; individual drive means associated with each of said article holders for rotating said article holders when said holders are conveyed past said spray station; means for intermittently selectively actuating said spray gun as each of said article holders passes before said spray station to thereby spray the unmasked central region of an article held by said holder; and means for automatically removing said masks from said other ends of said articles after said central regions of said articles have been painted, said means including a rotatably driven arm located adjacent said conveyor, said driven arm defining a notch therein adapted to engage said masks and remove them from the articles as they pass by said last named means.

5. Apparatus for use in spray painting a predetermined portion of the central region of each of a sequence of two ended articles, comprising: an endless belt type conveyor adapted to be driven past a spray station, said conveyor being adapted for movement from a predetermined point horizontally past said spray station and then in a generally vertically downward direction and thence generally upwardly back to said predetermined point; a paint spray gun located at said spray station; a plurality of article holders mounted in spaced alignment on said conveyor, each of said article holders being adapted for supporting one of said articles by an end thereof in a substantially vertical position, said article holders being adapted to mask the supported end of said articles from the paint to be sprayed; a plurality of masks, each of said masks being adapted to fit over and mask the other end of each of sad articles from the paint to be sprayed thereby leaving said central region of each of said articles exposed to the paint spray; an individual drive motor associated with each of said article holders and adapted to rotate said article holder when said holder is conveyed past said spray station; means for intermittently selectively actuating said spray gun as each of said article holders passes before said spray station to thereby spray the unmasked central region of an article held by said holder; and means for automatically removing said mask from said other end of said article after the central region of said article has been painted, said last named means including a rotatably driven arm located adjacent said conveyor where said conveyor travels in said generally vertically downward direction, said driven arm defining a notch therein adapted to engage said masks and remove them from the articles as they pass by said last named means.

References Cited in the file of this patent

UNITED STATES PATENTS

| | | |
|---|---|---|
| 951,293 | Thompson | Mar. 8, 1910 |
| 1,820,182 | Cooper | Aug. 25, 1931 |
| 1,981,149 | Parker et al. | Nov. 20, 1934 |
| 2,383,023 | Sykes et al. | Aug. 21, 1945 |
| 2,421,343 | Mageoch | May 27, 1947 |
| 2,600,161 | Fouse | June 10, 1952 |
| 2,675,778 | Peeps | Apr. 20, 1954 |
| 2,781,738 | Paasche | Feb. 19, 1957 |